No. 749,205. PATENTED JAN. 12, 1904.
E. KUNZ.
HEAT SAFE.
APPLICATION FILED JUNE 6, 1902.
NO MODEL. 2 SHEETS—SHEET 1.
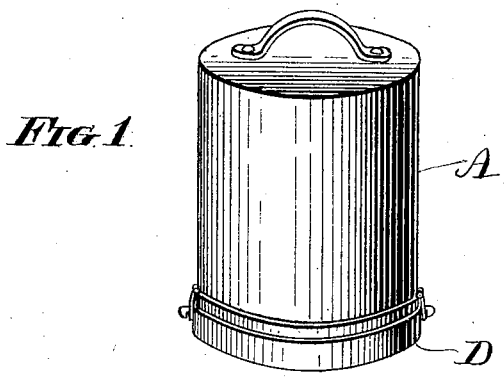
FIG. 1.
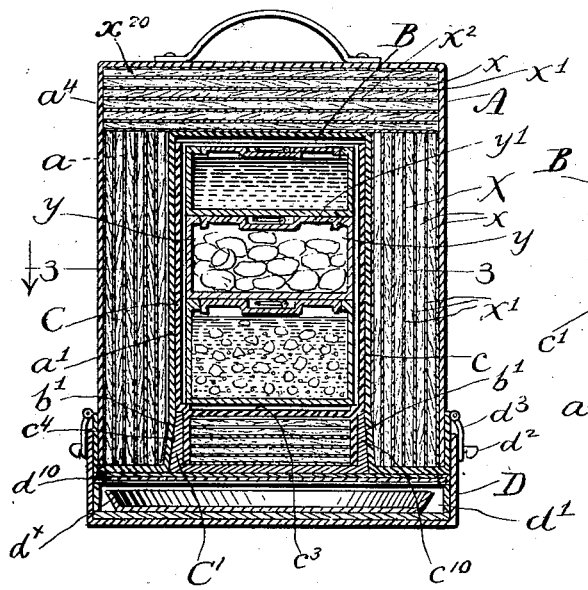
FIG. 2.
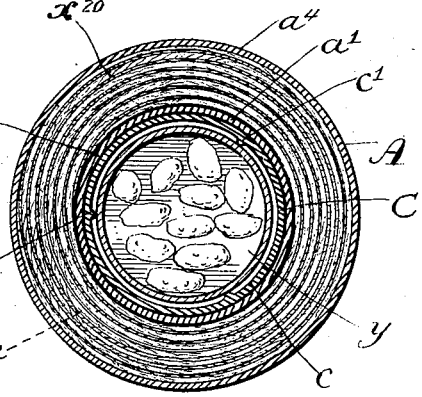
FIG. 3.
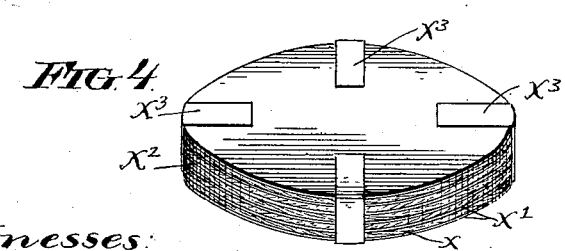
FIG. 4.
FIG. 5.
Witnesses: David Recher, Henry Hamp
Inventor: Emil Kunz
By J. B. Halpenny
Atty.
THE NORRIS PETERS CO., PHOTO-LITHO., WASHINGTON, D. C.

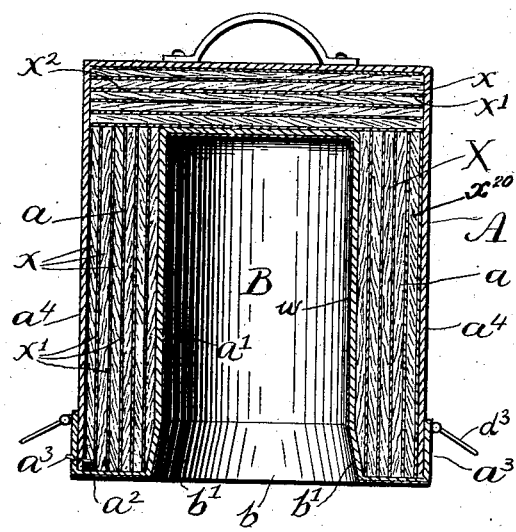
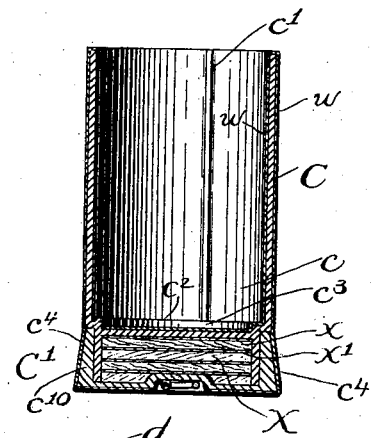
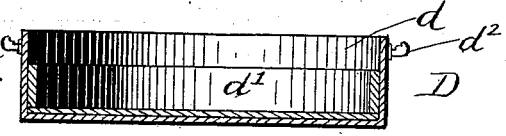
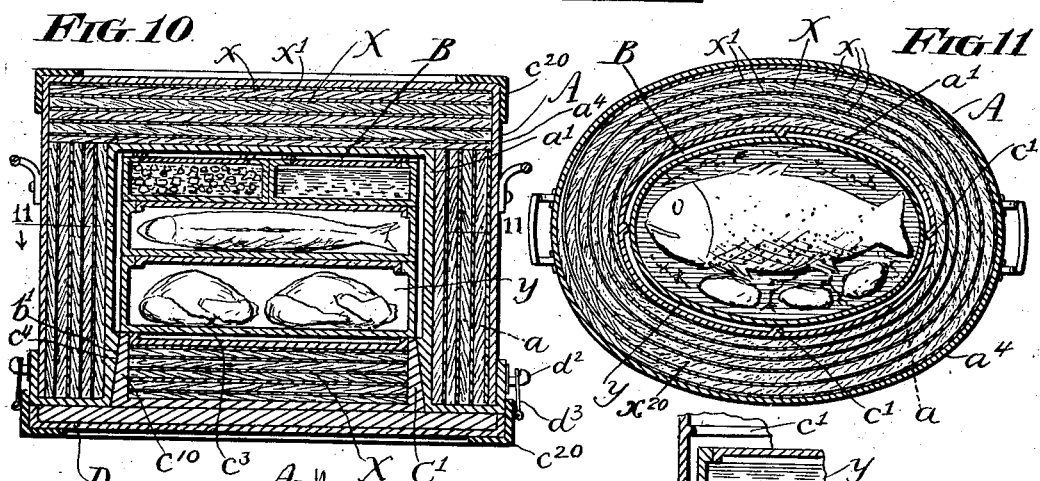

No. 749,205. Patented January 12, 1904.

UNITED STATES PATENT OFFICE.

EMIL KUNZ, OF CHICAGO, ILLINOIS.

HEAT-SAFE.

SPECIFICATION forming part of Letters Patent No. 749,205, dated January 12, 1904.

Application filed June 6, 1902. Serial No. 110,540. (No model.)

*To all whom it may concern:*

Be it known that I, EMIL KUNZ, of Chicago, Cook county, Illinois, have invented certain new and useful Improvements in Heat-Safes, of which the following is a specification.

The present invention relates to an apparatus for keeping cooked or heated foods whereby the foods when placed therein will retain sufficient heat for several hours and can then be served in a hot and savory condition, as if just freshly cooked. I have provided for this purpose a very compact, light, and simple device which especially can be used as a portable food-repository—as, for instance, it can be made in a size suitable as a dinner-pail for a workman, who can place a hot meal in it early in the morning and at noon or from eight to ten hours afterward on opening the apparatus he will find a hot dinner awaiting him. The apparatus can be made to readily hold a meal for a whole family, economizing labor and fuel and the discomfort of cooking in hot weather, while when a late dinner or supper is desired cold or warmed-over viands are entirely avoided. The apparatus also is very advantageous for a caterer, who may employ a number of the heat-safes and serve a dinner at any distance from his establishment about fifteen to twenty hours after the food left his kitchen and without recooking it.

The device will be found to have some novel features in its construction, which I have illustrated in the accompanying drawings and will hereinafter fully describe.

Referring to the views in the drawings, Figure 1 is a perspective view of an apparatus embodying features of my invention, the same being shown closed. Fig. 2 is a sectional elevation of the apparatus. Fig. 3 is a cross-section taken on the line 3 3 of Fig. 2. Fig. 4 is a perspective view of a heat-insulating pad employed in the top of the case. Fig. 5 is an enlarged sectional detail of the pad. Figs. 6, 7, and 8 are vertical sectional views of the case, inner receptacle, and base, respectively, each of said parts being shown separately. Fig. 9 is a sectional view of an insulating-disk used in the base. Fig. 10 is a vertical section of a modified form of the apparatus. Fig. 11 is a transverse section taken on the line 11 11 of Fig. 10. Fig. 12 is a sectional detail of one of the fastening devices for connecting the base to the case. Fig. 13 is a front view of same, and Fig. 14 is a detail showing a modification of the ribs in the food-holding receptacle.

The description of the invention will at first refer more particularly to the example illustrated in Figs. 1 to 9, inclusive, in which the principal parts, broadly speaking, consist of a case having double walls and a central tubular chamber open at its bottom, but surrounded on the sides and top by an inclosure containing heat-insulating material, a removable tube-like receptacle for containing food vessels and which is inserted in the chamber of the above-named case, and a base for supporting the parts and provided with means for closing the case.

In this application I have shown a composite filling or means for heat insulation. I have claimed and made this the subject of a separate application entitled "Heat-insulating devices," filed August 15, 1902, Serial No. 119,711.

A refers as a whole to the case, which has a central vertical tubular chamber B, provided with a mouth or open bottom $b$. As shown in Fig. 3, this chamber is cylindrical in shape; but it may be made oval in form or any other desirable shape. The case A is constructed so as to provide a double-walled structure surrounding the chamber, its sides, and the top, with the exception of its opening. The space $a$ between the two walls is closed, forming a sealed chamber or inclosure, which is filled with a heat-insulating material X. The following is the preferable construction of the case A: $a'$ refers to the inner shell or section of the case. This is provided with a horizontal extension $a^2$, preferably integral with the part $a'$, and an upturned flange or rim $a^3$. $a^4$ is the outer shell or section, which forms the top and vertical sides of the case. The section $a^4$ is engaged by the flange $a^3$ when the sections are placed together. The mouth of the chamber B is made sloping or tapering, as shown at $b'$. This is to effect a tight-fitting closure for the chamber. The sections $a'$ and $a^4$, the inner receptacle and base, are preferably made of pressed paper-pulp or indurated fiber or a similar material, so as to provide a comparatively light but strong structure and which is less liable to absorb heat than if made of metal. The parts when put together are sealed by a heat-resisting cement or similar material.

X refers as a whole to the heat-insulating filling or materials in the space $a$ or in other portions of the structure where the said filling is employed. This filling consists of comparatively thick sheets $x$ of a fibrous unwoven cellular fabric interposed between thin sheets $x'$ of a non-cellular fibrous material. More specifically speaking, I preferably employ thick sheets of an unwoven fibrous vegetable material, such as carded cotton, although flax, ramie, &c., may also be used and arranged alternately or between the sheets of cotton, thin sheets $x'$ of paper, preferably calendered or pressed manila paper. In preparing the cotton for the filling it is cleaned and carded and pressed to some extent, so as to have a uniform thickness of about one-tenth to one-eighth of an inch. The resulting fabric, while somewhat similar to what is known commercially as "wadding," is thinner, tougher, and more cohesive in its structure, thus being more readily cut and handled and formed with the sheets of paper into a compact insulating device. The sheet of cotton $x$, above mentioned, is cellular, having small air-cells or interstices $x^{20}$. The process of carding arranges the individual fibers longitudinally or in one direction generally. The cells or interstices $x^{20}$, which are to some extent elongated, run longitudinally and not across the fabric. The cotton $x$ and the paper $x'$ when arranged together form a compact composite heat-insulating filling or structure which is flexible and may be wound, if desired, around the chamber or part to be insulated. The filling X is also transversely elastic to some extent and if dented by a blow will resume its original shape. To better handle the filling X when placed in a flat position, it may be made in the form of a pad $x^2$, as shown in Fig. 4, which may be of any suitable shape to fill the cavity or casing in which it is placed. This composite pad is more readily inserted or removed from the casing than if loose sheets were employed.

To form the filling around the chamber B, a sheet of cotton $x$ and of paper $x'$ is wound around the shell $a'$ before the sections are placed together. This forms a vertical spiral of cotton and paper, as shown in Figs. 2 and 3. I only employ this spiral filling to extend to the top of the chamber B, and above this I place a pad $x^2$, composed of layers of the same materials, which extends across said chamber, the said layers being arranged horizontally. For convenience in arranging the filling I bind the layers of the pad with strips $x^3$, as shown in Fig. 4.

C refers to the inner receptacle, which is designed to hold one or more vessels for food. This receptacle is a tube-like device $c$, into which the vessels $y$ may be placed before said receptacle is inserted in the case. This receptacle is mainly made in one piece, as shown in the drawings, and is provided with ribs $c'$, so that the vessels placed therein will have but a minimum amount of contact with same, and thus prevent a direct absorption of heat. I also provide a flange $c^2$, so as to leave a recess $c^3$, as shown in Fig. 2, so that the lower outer edge of a vessel will only be in contact with said receptacle. In the bottom of the receptacle C, I place a pad of the filling X, as already described, and I also provide the receptacle with means C' for effecting a closure of the opening into the chamber B. This consists, preferably, of making the lower part of same with sloping or beveled sides $c^4$, thus forming a stopper. I make this part preferably as a cup-like part $c^{10}$, which incloses the filling X.

D refers to the base of the apparatus. This consists principally of a dish-like part $d$, which incloses the bottom of the case. In this base I preferably leave a space $d'$, into which a plate $d^\times$ or a pie may be placed. $d^{10}$ is a removable insulating-pad. The base D is provided with movable catches $d^2$, which engage loops $d^3$ on the case A; but I do not desire to limit myself to any specific means for connecting the base to the case, as it is quite evident various means may be employed for the same purpose.

The vessels for containing food may consist of one or more receptacles $y$, having tightly-fitting covers $y'$, so as to prevent the escape of the flavor or steam from the food.

In using the apparatus the food may be partially cooked—say for from fifteen to twenty minutes—and then placed in a vessel $y$ and inclosed in the apparatus, and to a certain extent the process of cooking will be carried on by the contained heat. This applies particularly to cereals, stews, soup, &c., which by the use of the apparatus a long continuous cooking on a stove is avoided. It has been found that food which is approximately at 200° Fahrenheit when placed in the apparatus will when opened twelve hours later have a temperature of 140°, as hot as is desirable for immediate consumption.

The apparatus may be modified to some extent without departing from the essential features of my invention. Thus it is not absolutely essential that a removable receptacle C should be provided, as the food vessels may be placed directly in the chamber B, as shown in Fig. 9, in which case I simply employ the part C' to effect the closure of the device. In this figure and Fig. 10 I show the apparatus as made suitable for a caterer and preferably oval in form, in which case it may be advisable to use metal reinforcements $c^{20}$, as shown, to protect the corners of the apparatus. It will also be obvious that while I have mentioned the employment of the device for preventing the exudation of heat from hot foods the apparatus on account of its heat-insulating properties may also be employed for keeping cold or frozen foods for a long time. Thus ice-cream may be placed in the receptacle and will still be found in a frozen condition after several hours.

The interior of the chamber B and the receptacle C may be coated with a moisture-proof and heat-resisting coating material $w$, as shown in Figs. 6 and 7; but this is not an absolutely essential feature of the invention, for by employing a casing or receptacle made of a sufficiently hardened or pressed material it will resist the effects of moisture for ordinary purposes.

What I claim is—

1. A portable food-repository having a chamber provided with double walls and having between the said walls a heat-insulating filling, the said chamber being provided with a tapered or bell-shaped mouth $b'$, in combination with a stopper or closing device having tapered sides $c^4$ and a closed interior having an insulating-filling, and a device D which retains the stopper in position, the said device being provided with means by which it may be connected to the main body of the repository, as set forth.

2. In a portable food-repository, a chamber having double walls forming a space $a$, the said space being filled along its sides with vertical sheets of cellular and non-cellular heat-insulating materials arranged alternately and across one end with alternate horizontal sheets of the same materials, the said chamber being provided with an opening and a closing device, the said device being suitably heat-insulated, as set forth.

3. In an apparatus of the class described, a double-walled case A having between its walls a heat-insulating filling, consisting of alternate sheets of cotton and paper, the case being provided with a chamber for food vessels, and suitable means for closing the opening into said chamber, as set forth.

4. In an apparatus of the class described, a double-walled case having between its walls a filling consisting of alternate sheets of a carded fibrous vegetable material having interstices $x^{20}$ and a non-cellular fibrous material, the said case having a chamber for food vessels, and provided with suitable means for closing the opening into same, as set forth.

5. In an apparatus of the class described, a double-walled case, the said walls consisting of an indurated fibrous material and having between the walls a filling of alternate layers of a cellular fibrous material and a non-cellular fibrous material, as set forth.

6. In combination, the case A having double walls $a\ a'$, a heat-insulating filling between said walls, a chamber B having a tapered opening $b'$, a closing device having tapered sides $c^4$ and a removable part D which slips over the case A and is provided with catches for connecting the parts together, as set forth.

7. In an apparatus of the class described, the case A, having walls $a\ a'$, a heat-insulating filling between said walls, a chamber B, a removable receptacle C, and dish-like part D provided with a chamber $d'$, and means for securing said part to the case A, as set forth.

In testimony whereof I have hereunto subscribed my signature this 31st day of May, A. D. 1902.

EMIL KUNZ.

In presence of—
J. B. HALPENNY,
DAVID RECHER.